(12) United States Patent
Novak

(10) Patent No.: US 6,409,820 B1
(45) Date of Patent: Jun. 25, 2002

(54) HYDRAULIC BINDER

(75) Inventor: Denes Novak, Markt Piesting (AT)

(73) Assignees: Wopfinger Stein- und Kalkwerke Schmid & Co., Waldegg-Wopfing; Dipl.Ing. Denes Novak, Markt Piesting, both of (AT)

( * ) Notice: Subject to any disclaimer, the term of this patent is extended or adjusted under 35 U.S.C. 154(b) by 71 days.

(21) Appl. No.: 09/695,447

(22) Filed: Oct. 24, 2000

(30) Foreign Application Priority Data

Dec. 23, 1998 (AT) ............................................ A2163/98

(51) Int. Cl.[7] ............................... C04B 7/14; C04B 7/21
(52) U.S. Cl. ........................ 106/714; 106/789; 106/791
(58) Field of Search ................................ 106/714, 789, 106/791

(56) References Cited

U.S. PATENT DOCUMENTS

| | | | | |
|---|---|---|---|---|
| 4,662,941 A | * | 5/1987 | Hagerman | 106/714 |
| 5,472,917 A | * | 12/1995 | Talling et al. | 106/714 |
| 5,584,926 A | * | 12/1996 | Borgholm et al. | 106/713 |

* cited by examiner

*Primary Examiner*—Elizabeth D. Wood
(74) *Attorney, Agent, or Firm*—Herbert Dubno

(57) ABSTRACT

A hydraulic binder containing a glassy bulky slag milled to a fineness above 5000 $cm_2$. Blaine and wherein the latently hydraulic blast furnace slag has a glassiness above 93%, contains 34 to 40% $SiO_2$, 34 to 37% CaO and above 9% and previously below 13% $Al_2O_3$. The $(CaO+MgO)/(Al_2O_3+SiO_2)$ ratio ranges from 0.88 to 0.98. Preferably the binder contains 0.5 to 5% porcelain cement clinker or porcelain cement. The above conditions can be met by mixing several slags.

20 Claims, No Drawings

HYDRAULIC BINDER

FIELD OF THE INVENTION

The present invention relates to a hydraulic binder and, more particularly, to a hydraulic binder utilizing a finely ground bulky latently hydraulic blast furnace slag, a sulfate promoter and activating additives. The term "finely divided" as used herein with reference to the slag refers to a fineness in excess of 5,000 cm$^2$/g Blaine.

BACKGROUND OF THE INVENTION

Blast furnace slags are a by-product of iron ore refining. In the blast furnace, a liquid slag is formed which floats on the molten iron and is comprised of clay, silica and lime containing components which separate from the iron ore and of limestone and of impurities in the coke at temperatures of about 1900°. This is referred to as blast furnace slag and is quenched at about 14000° C. with water. In this rapid cooling, a highly vitreous granulate is formed which has latently hydraulic binding capabilities. The glassy blast furnace slag cannot be used however as a stand alone binder. Its hardening energy can be activated by the addition of promoters. The activation is basically effected in two ways: by the addition of hydrated lime or cement (alkali activation) and by the addition of calcium sulfate (sulfatic activation). However, not every slag can be activated similarly.

The latent hydraulic binding force of the slag depends upon the composition thereof. Thus, Dr. Fritz Keil in "Cement, Manufacture and Characteristics", Springer-Verlag, Berlin, 1971, has described at page 116 the quality of the slag as depending upon the ratio (CaO+CaS+0.5MgO+Al$_2$O$_3$)/(SiO$_2$+MnO), referred to as the F value. If the F value lies above 1.9, the slag is considered to be very good from a hydraulic binding point of view. Below 1.5, it is considered only moderately hydraulic.

A further criterion of slag activity is the SiO$_2$ content. Slags with less than 32% SiO$_2$ in general are considered highly hydraulic and slags with more than 37% SiO$_2$ are considered as less hydraulic.

With respect to the alkali activation, according to EN (European Standard) 197-1 for cement production, the slag quality must conform to the following requirement: the ratio (CaO+MgO)/SiO$_2$ must be greater than 1.0.

For the sulfatic activation the literature with respect to slag indicates that it should have an Al$_2$O$_3$ content of at least 13% and the ratio (CaO+MgO+Al$_2$O$_3$)/SiO$_2$ should be above 1.6.

Numerous Patents deal with a CaO content in excess of 40% and an Al$_2$O$_3$ content above 14% (see for example the Canadian Patent 1,131,664).

In the Canadian Patent 1,131,664, a binder is described that has the following composition:
- 80–85% Granulated blast-furnace Slag (with 40–50% CaO, 14–20% Al$_2$O$_3$, 30–35% SiO$_2$, 5–8% MgO).
- 13–17% CaSO$_4$ (calculated as the anhydrite)
- 1.5–2.5% Portland Cement
- 0.1–0.5% of an organic carboxylic acid or a salt thereof
- 0.03–0.6 methyl cellulose, sodium stearate or sodium laurylbenzoylsulfonate and
- 0.6–2% sodium sulfate.

High hydraulic slags are used in accordance with those teachings. To improve the slag for this purpose, Al$_2$O$_3$ and CaO can be added to the slag and the mixture then heated.

Based upon the aforedescribed criteria, however, most of the blast furnace slags have been found to be only moderately hydraulic. Such low-value blast furnace slags can be used as additives in the cement industry to a maximum of 65% in cements. Exceeding this proportion rapidly lowers the strength of the cement product. The concrete industry can also use the lower value blast furnace slag as aggregates or additives to a limited extent only.

OBJECTS OF THE INVENTION

It is therefore an object of the present invention to provide a binder of the type described which can use a low value slag but nevertheless obtain a high value product.

Still another object of the invention is to produce a binder which is free from drawbacks of earlier systems.

DESCRIPTION

These objects and others which will become apparent hereinafter are attained, in accordance with the invention with a hydraulic binder comprised of a latently hydraulic bulky blast furnace slag, finely ground to in excess of 5,000 cm$^2$/g Blaine, containing a sulfate promoter and activating additives, and wherein the latently hydraulic bulky blast furnace slag has substantially the following analysis:
- Glassiness: >93%,
- SiO$_2$: 34 to 40% by weight,
- CaO: 34 to 37% by weight,
- Al$_2$O$_3$: >9% by weight, and
- (CaO+MgO)/(Al$_2$O$_3$+SiO$_2$) : 0.88–0.98.

It has been found, quite surprisingly, that a slag of this composition or fulfilling these requirements yields good products even when the slag would be the usual criteria described above, be considered just a moderately hydraulic substance.

In other words, following the requirements of the invention, slags with less than 13% by weight Al$_2$O$_3$ can be used and can have F values below 1.5 and a ratio (CaO+MgO+Al$_2$O$_3$)/SiO$_2$ below 1.6.

A single slag alone seldom can satisfy all of these requirements according to the invention. Since, however, there are large numbers of low value slags, it is often possible to form a mixture of at least two blast furnace slags so that the mixture provides all of these requirements. This has the further advantage that the degree of activation is much higher when the above mentioned prerequisites are obtained by a mixture of slags from different sources.

The activation of the slag is effected by the addition, mixing or milling with the slag of natural calcium sulfate (natural gypsum), flue gas desulfurization gypsum (or its anhydrite) in an amount of 12 to 20% by weight, Portland cement in an amount of 0.5 to 5% by weight and/or other CaO carriers like hot dust, burnt lime or Ca(OH)$_2$ in an amount of 0.5 to 3%, alkali sulfates or alkali carbonates in amounts up to 3% by weight and/or calcium salts of carboxylic acids in amounts of 0.5 to 3%. The use of hot dust (hot meal) obtained from flue or kiln gases, for example, has been found to be advantageous and accelerates the hydration of the slag and increases the compressive strength. The hot meal can be a raw meal which has been deacidified to 70 to 90% and of the type which is collected in the lowermost cyclone stage of the heat exchanger furnace at 800 to 900° C. in the production of Portland cement clinker. The meal can be recovered by a pass from the furnace system and contains principally CaO.

Prisms product from the binder of the invention show higher resistance to sulfate attack and have strengths in the strength classes of the Austrian standard B3310 (ÖNORM)

and the European standard (EN) 197-1 and are comparable with conventional Portland cement or better.

EXAMPLE

The invention is elucidated further by means of the following example. A binder was made from the following components:

85% blast furnace slag (Blaine value 5800 cm²/g)
13% flue gas desulfurization gypsum
1% Portland cement
0.5% Calcium acetate (all percentages by weight).

The slag used was the slag of the invention and it was compared with another slag. The data as to the slags and the resulting strengths are given in the following tables:

| Analysis | Slag Mixture Suitable | | Slag Mixture Not Suitable | |
|---|---|---|---|---|
| Glassiness | 94 | | 94 | |
| SiO2 % | 38.3 | | 37.3 | |
| Al2O3 % | 11.2 | | 10 | |
| CaO % | 35.8 | | 38.2 | |
| MgO % | 9 | | 10.5 | |
| (CaO + MgO)/(Al$_2$O$_3$ + SiO$_2$) | 0.91 | | 1.03 | |
| Compressive Strength N/mm² | ÖN B3310 | EN196-1 | ÖN B3310 | EN196-1 |
| after 2 days | | 7 | | 9 |
| after 3 days | 10 | 11 | | |
| after 7 days | 26 | 30 | 15 | 18 |
| after 28 days | 46 | 49 | 22 | 24 |

The strength obtained can additionally be substantially increased with concrete additives with thinning agents for reducing the water/binder ratio from 0.6 to 0.30.

The binder of the invention has very low hydration heat and it is therefore highly suitable for clarifier basins, channel linings, clarifier plants, collection basins and building structures which may be subject to sulfate attack.

I claim:

1. A hydraulic binder comprised of a latently hydraulic bulky blast furnace slag, finely ground to in excess of 5,000 cm²/g Blaine, containing a sulfate promoter and activating additives, and wherein the latently hydraulic bulky blast furnace slag has substantially the following analysis:

Glassiness: >93%,
SiO$_2$: 34 to 40% by weight,
CaO: 34 to 37% by weight,
Al$_2$O$_3$: >9% by weight, and
(CaO+MgO)/(Al$_2$O$_3$+SiO$_2$): 0.88–0.98.

2. The binder defined in claim 1 wherein the Al$_2$O$_3$ content in the blast furnace slag is at most 13% by weight.

3. The binder defined in claim 2 wherein the bulky blast furnace slag is a mixture of at least two different blast furnace slags.

4. The binder defined in claim 3 wherein the bulky blast furnace slag has a Blaine fineness of 5,000 to 6500 cm²/g.

5. The binder defined in claim 4 which contains 0.5 to 5% by weight of a portland cement clinker or portland cement.

6. The binder defined in claim 5 which contains 12 to 20% by weight of a calcium sulfate recovered by settling from a flue gas desulfurization or a hemihydrate or anhydrite thereof, natural calcium sulfate or a mixture thereof.

7. The binder defined in claim 6 which contains 0.5 to 3% by weight of hot dust, hydrated lime or burned lime.

8. The binder defined in claim 7 which contains up to 3% by weight of an alkali sulfate or an alkali carbonate or a mixture thereof.

9. The binder defined in claim 8 wherein said alkali sulfate or alkali carbonate are selected from the group which consists of K$_2$SO$_4$, Na$_2$SO$_4$, Na$_2$CO$_3$, Li$_2$CO$_3$ and K$_2$SO$_3$.

10. The binder defined in claim 8 which contains 0.5 to 3% by weight of a calcium salt of a carboxylic acid.

11. The binder defined in claim 10 wherein said calcium salt of a carboxylic acid is selected from the group which consists of calcium acetate and calcium formiate and mixtures thereof.

12. The binder defined in claim 1 wherein the bulky blast furnace slag is a mixture of at least two different blast furnace slags.

13. The binder defined in claim 1 wherein the bulky blast furnace slag has a Blaine fineness of 5,000 to 6500 cm²/g.

14. The binder defined in claim 1 which contains 0.5 to 5% by weight of a portland cement clinker or portland cement.

15. The binder defined in claim 1 which contains 12 to 20% by weight of a calcium sulfate recovered by settling from a flue gas desulfurization or a hemihydrate or anhydrite thereof, natural calcium sulfate or a mixture thereof.

16. The binder defined in claim 1 which contains 0.5 to 3% by weight of hot dust, hydrated lime or burned lime.

17. The binder defined in claim 1 which contains up to 3% by weight of an alkali sulfate or an alkali carbonate or a mixture thereof.

18. The binder defined in claim 17 wherein said alkali sulfate or alkali carbonate are selected from the group which consists of K$_2$SO$_4$, Na$_2$SO$_4$, Na$_2$CO$_3$, Li$_2$CO$_3$ and K$_2$SO$_3$.

19. The binder defined in claim 1 which contains 0.5 to 3% by weight of a calcium salt of a carboxylic acid.

20. The binder defined in claim 19 wherein said calcium salt of a carboxylic acid is selected from the group which consists of calcium acetate and calcium formiate and mixtures thereof.

* * * * *